(12) United States Patent
Lee et al.

(10) Patent No.: US 8,029,970 B2
(45) Date of Patent: Oct. 4, 2011

(54) COMPOSITION FOR MANUFACTURING BARRIER RIB, AND PLASMA DISPLAY PANEL MANUFACTURED BY THE SAME

(75) Inventors: Beom-Wook Lee, Yongin-si (KR);
Jong-Seo Choi, Yongin-si (KR);
Kwi-Seok Choi, Yongin-si (KR);
Dong-Hyun Kang, Yongin-si (KR);
Myung-Duk Lim, Yongin-si (KR);
Hoon-Bae Lee, Yongin-si (KR);
Bum-Jin Chang, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 1100 days.

(21) Appl. No.: 11/753,049

(22) Filed: May 24, 2007

(65) Prior Publication Data

US 2008/0290314 A1    Nov. 27, 2008

(30) Foreign Application Priority Data

Mar. 2, 2007    (KR) .................. 10-2007-0021134

(51) Int. Cl.
*G03C 1/00*    (2006.01)
*H01L 29/12*    (2006.01)

(52) U.S. Cl. .................. 430/270.1; 252/62.3 V
(58) Field of Classification Search .............. 430/270.1; 252/62.3 V
See application file for complete search history.

(56) References Cited

U.S. PATENT DOCUMENTS

| | | | |
|---|---|---|---|
| 5,209,688 | A | 5/1993 | Nishigaki et al. |
| 6,117,614 | A | 9/2000 | Takahashi et al. |
| 6,197,480 | B1 | 3/2001 | Iguchi et al. |
| 6,342,322 | B1 | 1/2002 | Kakinuma et al. |
| 6,507,148 | B1 | 1/2003 | Iguchi et al. |
| 6,576,391 | B1 | 6/2003 | Iguchi et al. |
| 2005/0037278 | A1 | 2/2005 | Koishikawa et al. |
| 2005/0271979 | A1 | 12/2005 | Lee et al. |
| 2007/0048462 | A1 | 3/2007 | Takebe et al. |
| 2007/0287094 | A1 | 12/2007 | Mori |

FOREIGN PATENT DOCUMENTS

| | | |
|---|---|---|
| JP | 4-163552 | 6/1992 |
| JP | 11-73874 | 3/1999 |
| JP | 11-139846 | 5/1999 |
| JP | 2000-290040 | 10/2000 |
| JP | 2000-294147 | 10/2000 |
| JP | 2002-122985 | 4/2002 |
| JP | 2002-214772 | 7/2002 |
| JP | 2004-318116 | * 11/2004 |
| KR | 2002-12626 | 2/2002 |
| KR | 10-412293 | 11/2003 |
| KR | 2006-100270 | 9/2006 |

OTHER PUBLICATIONS

US Office Action issued on Sep. 17, 2008, in co-pending U.S. Appl. No. 11/764,991.
US Office Action issued on Mar. 5, 2009, in co-pending U.S. Appl. No. 11/764,991.
US Office Action issued on Oct. 20, 2009, in co-pending U.S. Appl. No. 11/764,991.
Japanese Office Action dated Nov. 24, 2009.
U.S. Appl. No. 11/764,991, filed Jun. 19, 2007, Lee et al., Samsung SDI Co., Ltd.
English Abstract for PCT International Publication No. WO 96/42035.
U.S. Office Action for U.S. Appl. No. 11/764,991; First Named Inventor: Beom-Wook Lee; dated May 10, 2010; 12 pgs.

* cited by examiner

*Primary Examiner* — Robert D. Harlan
(74) *Attorney, Agent, or Firm* — Knobbe Martens Olson & Bear LLP

(57) ABSTRACT

The composition for a barrier rib of the present invention includes a metal oxide sol and a glass frit. The metal oxide sol includes a photoacid generator, and the difference between the average refractive index ($N_1$) of the metal oxide sol and average refractive index ($N_2$) of the glass frit satisfies the following Equation 1:

$$-0.2 \leq N_1 - N_2 \leq 0.2. \qquad \text{Equation 1}$$

54 Claims, 1 Drawing Sheet

FIG. 1

COMPOSITION FOR MANUFACTURING BARRIER RIB, AND PLASMA DISPLAY PANEL MANUFACTURED BY THE SAME

CROSS-REFERENCE TO RELATED APPLICATIONS

This application claims the benefit of Korean Application No. 2007-0021134, filed Mar. 2, 2007, in the Korean Intellectual Property Office, the disclosure of which is incorporated herein by reference.

BACKGROUND OF THE INVENTION

1. Field of the Invention

Aspects of the present invention relate to a barrier rib-forming composition and to a plasma display panel including a barrier rib formed from the barrier rib-forming composition. More particularly, aspects of the present invention relate to a barrier rib-forming composition that resists an exposure sensitivity decrease caused by exposure to oxygen and thereby allows a high-sensitive, high resolution, and high-definition barrier rib to be formed in a process that requires only a single exposing.

2. Description of the Related Art

A plasma display panel (PDP) is a display device that forms an image by exciting a phosphor with vacuum ultraviolet (VUV) rays generated by gas discharge in discharge cells. Since a plasma display panel is capable of forming a large, high-resolution screen, thin plasma display devices have become popular. Recently, a reflective AC driving panel has been used for the plasma display panel, which includes a rear substrate formed with a phosphor layer on an interior portion between barrier ribs. A typical PDP has a structure as follows: On a rear substrate, address electrodes are disposed in one direction and a dielectric layer is disposed on the address electrodes. Barrier ribs are formed on the dielectric layer in a striped pattern. Red (R), green (G), and blue (B) phosphor layers are positioned on the discharge cells between the barrier ribs. On one surface of a front substrate facing the rear substrate, display electrodes are formed in a crossing direction to that of the address electrodes, wherein a display electrode is composed of a pair of transparent electrodes and a bus electrode. A dielectric layer and a protection layer are formed on the front substrate, and cover the display electrodes. A discharge cell is formed on the cross-section of the address electrodes of the rear substrate and the display electrodes of the front substrate.

The barrier ribs of the plasma display panel maintain a discharge space and prevent electro-optical cross-talk among discharge cells. Barrier ribs may be formed by forming an address electrode and a dielectric layer on a rear substrate of the plasma display panel and subjecting the deposited layer to sandblast, etching, or photolithography. Regarding photolithography, U.S. Pat. No. 6,197,480 discloses a method of fabricating a barrier rib can with a single exposure including: minimizing the refractive index difference of between a glass frit and a vehicle; and minimizing the photo scattering and reflectivity of irradiated light on the interface of the glass frit and the vehicle upon exposing the light. Similarly, U.S. Pat. No. 6,117,614 discloses a method of forming a barrier rib using a glass frit and a vehicle and in which the refractive index difference between the glass frit and the vehicle is minimized, as in U.S. Pat. No. 6,197,480. The vehicle includes a photoacid generator to promote a chemically amplified cross-linking reaction. However, although the photolithography methods disclosed in these patents have merits in the simple process compared to sandblasting and etching and in providing a high resolution barrier rib, they cause the following problems:

In the methods described in the above patents, it is impossible to add powders such as titania, alumina, silica, zirconia, yttria, magnesia, zinc oxide, or tin oxide which are used for maintaining the shape of the barrier ribs and increasing the reflectivity of the barrier ribs during baking processes in the sandblasting or etching methods. Because such powders have either a very high or a very low refractive index (for example, silica has a very low refractive index), it is impossible to minimize the refractive index difference between such powders and the vehicle. Further, these powders inhibit the transmission of irradiated ultraviolet such that the barrier ribs can not be formed by a single exposure. Solutions for increasing the reflective index of the barrier ribs have been suggested in Japanese Laid-open Publication No. 2004-318116. According to this publication, the reflectivity of barrier ribs can be increased by adding 5 to 80 nm particles such as titania, alumina, silica, zirconia, yttria, magnesia, zinc oxide, manganese oxide, iron oxide, tin oxide, copper oxide, lead oxide and so on. The addition of such particles increases the reflective index of the vehicle is increased and reduces the scattering or reflecting of the irradiated light during photolithography. Thereby, it is not necessary to add a glass frit having the low refractive index and a vehicle having a high refractive index. However, the method described in Japanese Laid-open Publication No. 2004-318116 has the disadvantage that when a paste is prepared by combining 5 to 80 nm particulates with a photosensitive organic component, the particulates tend to not be dispersed in the paste in the form of single particles, but rather become agglomerated. As the result, the agglomerated particles inhibit ultraviolet light from being transmitted through the material during formation of the barrier ribs and therefore, the barrier ribs cannot be formed in a single exposure.

SUMMARY OF THE INVENTION

According to one aspect of the present invention, there is provided a barrier rib-forming composition that is resistant to an exposure sensitivity decrease caused by oxygen and and that forms highly-sensitive, high resolution, and a high-definition barrier rib in a one-exposure process.

According to another aspect of the present invention, there is provided a plasma display panel including the barrier rib fabricated using the barrier rib-forming composition.

According to another aspect of the present invention, there is provided is a barrier rib-forming composition that includes a metal oxide sol and a glass frit. The metal oxide sol includes a photoacid generator, and the difference between the average refractive index ($N_1$) of the metal oxide sol and average refractive index ($N_2$) of the glass frit satisfies the following Equation 1:

$$-0.2 \leq N_1 - N_2 \leq 0.2 \qquad \text{Equation 1}$$

In other words, the difference between the average refractive index ($N_1$) of the metal oxide sol and average refractive index ($N_2$) of the glass frit ranges from −0.2 to 0.2. As a specific, non-limiting example, the difference of the average refractive index of the metal oxide sol and that of the glass frit ranges from −0.1 to 0.1. As a more specific, non-limiting example, the difference of the average refractive index of the metal oxide sol and that of the glass frit ranges from −0.05 to 0.05.

According to another aspect of the present invention, the metal oxide sol includes metal oxide and vehicle, and the metal oxide is dispersed in the vehicle.

According to another aspect of the present invention, the metal oxide includes oxides of a metal selected from the group consisting of silicon (Si), titanium (Ti), aluminum (Al), zirconium (Zr), tantalum (Ta), germanium (Ge), yttrium (Y), zinc (Zn), and combinations thereof.

According to another aspect of the present invention, the metal oxide has an average particle diameter ranging from 1 to 60 nm. As a specific, non-limiting example, the metal oxide has an average particle diameter ranging from 2 to 40 nm. As a more specific, non-limiting example, the metal oxide has an average particle diameter ranging from 4 to 20 nm.

According to another aspect of the present invention, the metal oxide is present in an amount of 1 to 30 parts by volume based on 100 parts by volume of the glass frit.

According to another aspect of the present invention, the glass frit includes a low-melting glass frit and a high-melting glass frit. The difference between the refractive index ($N_3$) of the low-melting glass frit and refractive index ($N_4$) of the high-melting glass frit satisfies the following Equation 7.

$$-0.2 \leq N_3 - N_4 \leq 0.2 \qquad \text{Equation 7}$$

According to another aspect of the present invention, the vehicle includes a photoacid generator selected from the group consisting of an onium salt, sulfonium salt, an organic halogen, naphthoquinone-diazide-sulfonic acid, photoreactive sulfonic acid, and combinations thereof.

According to another aspect of the present invention, there is provided a plasma display panel including the barrier rib fabricated using the composition for a barrier rib.

According to another aspect of the present invention, there is provided a method of forming barrier ribs of a plasma display panel, the method comprising coating a substrate with a barrier rib-forming composition comprising a metal oxide sol and a glass frit, wherein the metal oxide sol comprises a photoacid generator, and wherein the difference between the average refractive index (N1) of the metal oxide sol and average refractive index (N2) of the glass frit satisfies the following Equation 1:

$$-0.2 \leq N_1 - N_2 \leq 0.2 \qquad \text{Equation 1}$$

forming barrier rib patterns on the substrate by photolithography of the barrier rib-forming composition; and firing the substrate having the barrier rib patterns formed thereon to form barrier ribs, wherein the coating of the substrate, forming of barrier rib patterns and firing the substrate are carried out only a single time.

According to another aspect of the present invention, there is provided a plasma display panel including barrier ribs, wherein the barrier ribs are formed by the method described above.

According to another aspect of the present invention, there is provided a plasma display panel comprising: a first substrate; a plurality of address electrodes disposed in a first direction on the first substrate; a first dielectric layer formed on the surface of the first substrate covering the plurality of address electrodes; a plurality of barrier ribs formed on the dielectric layer, wherein the barrier ribs are formed by the method described above; a plurality of phosphor layers formed between the barrier ribs; a second substrate spaced apart and facing the first substrate; a plurality of display electrodes disposed on the second substrate in a second direction to cross the address electrodes; a second dielectric layer formed on the second substrate covering the plurality of display electrodes; and wherein intersections of the display electrodes and the address electrodes define discharge cells of the plasma display panel.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The barrier rib-forming composition according to an embodiment of the present invention includes a metal oxide sol and a glass frit. The metal oxide sol includes a photoacid generator, and the difference between the average refractive index ($N_1$) of the metal oxide sol and average refractive index ($N_2$) of the glass frit satisfies the following Equation 1:

$$-0.2 \leq N_1 - N_2 \leq 0.2 \qquad \text{Equation 1}$$

The term "average refractive index of the metal oxide sol" refers to the refractive index of the metal oxide excluding a solvent. The refractive index of the metal oxide sol may be measured in accordance with various methods. According to one method of measurement, a transparent film or glass substrate is coated with the metal oxide sol, dried at 80 to 120° C. for several to scores of minutes to remove the solvent, and then, the refractive index is measured using a refractive index measurement instrument.

The metal oxide sol is formed as a sol by dispersing metal oxide particles having a size range of 1 to 60 nm in the vehicle, which is in a stable state such that coagulation or precipitation of the particles does not occur. The metal oxide sol may then be mixed with the glass frit.

The barrier rib formed from the barrier rib-forming composition including the metal oxide sol provides an increased brightness due to the high reflectivity in comparison to a conventional photosensitive barrier rib. Further, the metal oxide sol provides improved exposure sensitivity by preventing a cross-linking reaction due to exposure to oxygen.

As a non-limiting example, the metal of the metal oxide sol may be at least one selected from the group consisting of titanium (Ti), aluminum (Al), silicon (Si), zirconium (Zr), tantalum (Ta), germanium (Ge), yttrium (Y), and zinc (Zn), and combinations thereof.

The metal oxide sol is prepared by subjecting a metal alkoxide or metal halide to a hydrolysis and condensation reaction to form a metal oxide precursor and then dispersing the metal oxide precursor in a vehicle. During the preparation of the metal oxide precursor, a surface modifying agent may be added as needed.

The average particle diameter of the metal oxide precursor is determined depending upon the degree of the hydrolysis reaction and the condensation reaction and may range from 1 to 60 nm. As a more specific, non-limiting example, the average particle diameter of the metal oxide precursor may range from 2 to 40 nm. As an even more specific, non-limiting example, the average particle diameter of the metal oxide precursor may range from 4 to 20 nm. When the average particle diameter of the metal oxide precursor is less than 1 nm, it may be difficult to disperse the metal oxide precursor uniformly. Moreover, it may be difficult or uneconomical to obtain particles having an average particle diameter less than 1 nm. On the other hand, when the average particle diameter is more than 60 nm, light is scattered by the particles to such an extent that the transmission of light is inhibited.

The average refractive index of the metal oxide precursor may range from 1.3 to 3.0 and the average refractive index of the metal oxide sol may range from 1.4 to 2.0. When the average refractive indexes of the metal oxide precursor and metal oxide sol are out of these ranges, it is hard to provide a barrier rib having the average refractive index set forth in Equation 1. The term "refractive index of the metal oxide precursor" refers to the refractive index of the metal oxide precursor excluding the solvent. That is, in the measurement of the refractive index of the metal oxide precursor, the solvent is removed prior to the measurement.

In addition, when the metal oxide precursor is dispersed in the vehicle to provide a metal oxide sol, the amount of the metal oxide in the metal oxide sol may be between 5 and 50 parts by volume based on 100 parts by volume of the vehicle. When the amount of the metal oxide is less than 5 parts by volume, the reflectivity increasing efficiency of the barrier rib is reduced. On the other hand, when the amount of the metal oxide is more than 50 parts by volume, subsequent cross-linking reactions are inhibited so that it is difficult to produce a barrier rib having a required shape.

When the metal oxide sol is mixed with the glass frit, there are two considerations to determine the mixing ratio. The first consideration is the refractive index ($N_1$) of metal oxide sol and the refractive index ($N_2$) of glass frit. In particular, the refractive index of metal oxide sol and the refractive index of glass frit should satisfy the relationship set in the above Equation 1. As a specific non-limiting example, the refractive index of metal oxide sol and the refractive index of glass frit should satisfy the relationship set forth in the following Equation 2. As a more specific non-limiting example, the refractive index of metal oxide sol and the refractive index of glass frit should satisfy the relationship set forth in the following Equation 3.

$$-0.1 \leq N_1 - N_2 \leq 0.1 \quad \text{Equation 2}$$

$$-0.05 \leq N_1 - N_2 \leq 0.05 \quad \text{Equation 3}$$

When the difference between the refractive index of metal oxide sol and that of glass frit is outside of the range set forth in Equation 1, the transmission of irradiated light is worsened so that it is impossible to form a barrier rib by a one-exposure irradiation process. On the other hand, when the difference is within the boundaries set forth in Equation 3, the exposure sensitivity during an irradiation process of forming a barrier rib is improved and the scattering the light is reduced so that the linearity of the barrier rib pattern is improved.

The second consideration for determining the mixing ratio of the metal oxide sol and the glass frit is the amount of the metal oxide included in the metal oxide sol in relation to the amount of the glass frit. The amount of metal oxide may range from 1 to 30 parts by volume based on 100 parts by volume of glass frit. As a specific, non-limiting example, the amount of metal oxide may range from 2 to 20 parts by volume based on 100 parts by volume of glass frit. When the amount of metal oxide is less than 1 part by volume, the reflectivity increase efficiency for the barrier rib is worsened; on the other hand, when the amount of metal oxide is more than 30 parts by volume, the glass frit is insufficiently sintered in the formation of the barrier rib.

The average thermal expansion coefficients (CTE, α) of the metal oxide and glass frit may satisfy the following Equation 4:

$$\text{Thermal Expansion Coefficient of Substrate} \times 0.9 \leq \alpha \leq \text{Thermal Expansion Coefficient of Substrate} \quad \text{Equation 4}$$

If the average thermal expansion coefficients of the metal oxide and the glass frit are out of the range set in Equation 4, the substrate may become bent or broken after firing.

The glass frit in the barrier rib-forming composition may have an average refractive index ranging 1.5 to 1.8. When the average refractive index of the glass frit is out of this range, the refractive index difference between the glass frit and the metal oxide sol is too great such that a barrier rib cannot be formed in a one-exposure irradiation process.

The glass frit includes a low-melting glass frit and a high-melting glass frit. The low-melting glass frit plays a role of forming a dense barrier rib since it is sintered during the firing process. The high-melting glass frit plays a role of maintaining the shape of the barrier rib during the firing process.

The particle shape of the low-melting glass frit is not limited. As a non-limiting example, the particle shape may be a spherical shape, which provides an improved filling rate and ultraviolet (UV) transmittance. The particle diameter of the low-melting glass frit may have a mean value ($D_{50}$) ranging from 2 to 5 μm, a minimum value ($D_{min}$) of 0.1 μm, and a maximum value ($D_{max}$) of 20 μm. When the mean value is less than 2 μm, or the minimum value is less than 0.1 μm, the dispersibility of the glass frit and the printing characteristics of the barrier rib-forming composition are worsened the contractility during the firing process is too high to provide a barrier rib having a required shape. On the other hand, when the mean value is more than 5 μm or the maximum value is more than 20 μm, the density and the shape linearity of the barrier rib are worsened.

The softening temperature (Ts) of the low-melting glass frit may satisfy the definition set forth in Equation 5.

$$\text{Barrier Rib Firing Temperature} - 80° C. < Ts < \text{Barrier Rib Firing Temperature} \quad \text{Equation 5}$$

When the softening temperature of the low-melting glass frit is less than the firing temperature −80° C., the barrier rib shape may collapse during the baking process. When the softening temperature is more than the firing temperature, the sintering is insufficiently carried out.

The amount of the low-melting glass frit ranges from 70 to 100 volume % based on the total volume of the glass frit. When the amount of the low-melting glass frit is less than this range, the glass frit is insufficiently sintered during the firing process.

As a non-limiting example, the low-melting glass frit may include one or more oxides of one or more elements selected from the group consisting of lead (Pb), bismuth (Bi), silicon (Si), boron (B), aluminum (Al), barium (Ba), zinc (Zn), magnesium (Mg), calcium (Ca), phosphorus (P), vanadium (V), molybdenum (Mo), and tellurium (Te), and combinations thereof.

As a more specific, non-limiting example, the low-melting glass frit may include at least one selected from the group consisting of PbO—$B_2O_3$-based, PbO—$SiO_2$—$B_2O_3$-based, $Bi_2O_3$—$B_2O_3$-based, $Bi_2O_3$—$SiO_2$—$B_2O_3$-based, $SiO_2$—$B_2O_3$—$Al_2O_3$-based, $SiO_2$—$B_2O_3$—BaO-based, $SiO_2$—$B_2O_3$—CaO-based, ZnO—$B_2O_3$—$Al_2O_3$-based, ZnO—$SiO_2$—$B_2O_3$-based, $P_2O_5$-based, SnO—$P_2O_5$-based, $V_2O_5$—$P_2O_5$-based, $V_2O_5$—$Mo_2O_3$-based, and $V_2O_5$—$P_2O_5$—$TeO_2$-based glass frits, and combinations thereof.

The particle shape of the high-melting glass frit is not limited. As a non-limited example, the high melting glass frit may have a spherical shape since a spherical shape provides an improved filling rate and ultraviolet (UV) transmittance.

The particle diameter of the high-melting glass frit may have a mean value ranging from 1 to 4 µm, a minimum value of 0.1 µm, and a maximum value of 20 µm. When the mean value is less than 1 µm or the minimum value is less than 0.1 µm, the exposure sensitivity of the barrier rib-forming composition is worsened and the contraction rate is increased during the firing process so that it is difficult to provide a barrier rib having a required shape. On the other hand, when the mean value of the particle diameter of the high-melting glass frit is more than 5 µm or the maximum value is more than 20 µm, the densification of the barrier rib and the shape linearity of the barrier rib are worsened.

The softening temperature of the high-melting glass frit may satisfy the condition set forth in the following Equation 6.

$$Ts > \text{Barrier Rib Firing Temperature} + 20° C. \quad \quad \text{Equation 6}$$

When the softening temperature of the high-melting glass frit is less than the firing temperature +20° C., the barrier rib shape may collapse during the firing process.

The amount of the high-melting glass frit may range from 0 to 30 volume % based on the total volume of the glass frit. When the amount of the high-melting glass frit is more than this range, the glass frit is insufficiently sintered during the firing process. When the amount of metal oxide in the barrier rib-forming composition is high, it can serve the same purpose as the high-melting glass frit so that it may not be necessary to add a high-melting glass frit.

As non-limiting examples, the high-melting glass frit may include one or more oxides of one or more elements selected from the group consisting of silicon, boron, aluminum, barium, zinc, magnesium, and calcium, and combinations thereof.

As more specific, non-limiting examples, the high-melting glass frit may include at least one selected from the group consisting of $SiO_2$—$B_2O_3$—BaO-based, $SiO_2$—$B_2O_3$—CaO-based, $SiO_2$—$B_2O_3$—MgO-based, $SiO_2$—$B_2O_3$—CaO—BaO-based, $SiO_2$—$B_2O_3$—CaO—MgO-based, $SiO_2$—$Al_2O_3$—BaO-based, $SiO_2$—$Al_2O_3$—CaO-based, $SiO_2$—$Al_2O_3$—MgO-based, $SiO_2$—$Al_2O_3$—BaO—CaO-based, and $SiO_2$—$Al_2O_3$—CaO—MgO-based glass frits, and combinations thereof.

The average refractive index of the low-melting glass frit and the high-melting glass frit may range from 1.5 to 1.8. The difference between the refractive index ($N_3$) of the low-melting glass frit and the refractive index ($N_4$) of the high-melting glass frit should satisfy the condition set forth in the following Equation 7. As a specific, non-limiting example, the difference between the refractive index ($N_3$) of the low-melting glass frit and the refractive index ($N_4$) of the high-melting glass frit may satisfy the condition set forth in the following Equation 8. As an even more specific, non-limiting example, the difference between the refractive index ($N_3$) of the low-melting glass frit and the refractive index ($N_4$) of the high-melting glass frit may satisfy the condition set forth in the following Equation 9.

$$-0.2 \leq N_3 - N_4 \leq 0.2 \quad \quad \text{Equation 7}$$

$$-0.1 \leq N_3 - N_4 \leq 0.1 \quad \quad \text{Equation 8}$$

$$-0.05 \leq N_3 - N_4 \leq 0.05 \quad \quad \text{Equation 9}$$

When the refractive index difference between the low-melting glass frit and the high-melting glass frit is out of the range set forth in Equation 7, the transmittance of irradiated light is decreased so that it is impossible to form a barrier rib by a one-exposure irradiation process.

The barrier rib-forming composition may be a negative type photosensitive composition. That is, the barrier rib-forming composition may be selected such that the barrier rib-forming composition is soluble in a developing solution and such that a selected portion of the barrier rib-forming composition can be made insoluble in the developing solution by irradiation and subsequent baking. In particular, the vehicle of the metal oxide sol of the barrier rib-forming composition includes a photoacid generator that generates acid when irradiated, and a binder that undergoes a cross-linking reaction in the presence of the acid when the barrier rib-forming composition is baked to convert the irradiated portion of the barrier rib composition from the soluble sate to the insoluble state. The developing solution that removes the soluble portion of the barrier rib-forming composition may include pure water or an organic solvent. As a non-limiting example, the developing solution may include an alkali solution, which has advantages in developing performance, environmental stability, and cost. The barrier rib-forming composition may further include a cross-linking agent that promotes the crosslinking of the binder, an additive for improving the characteristics of the paste, and a solvent for controlling the viscosity.

The binder may be selected to be soluble in the alkali developing solution in order to provide improved dispersion of the inorganic component in the photosensitive paste and a suitable viscosity and an elastic characteristic. As non-limiting examples, the binder may include at least one selected from the group consisting of a resin including a phenolic hydroxyl group, a hydroxystyrene resin, a resin having an epoxy group, and a resin having hydroxyl and carboxyl groups, and combinations thereof.

The resin including a phenolic hydroxyl group may be, for example, a novolac resin that is prepared by a condensation reaction of phenol and aldehyde, or phenol and ketone in the presence of an acid.

The hydroxystyrene resin may be prepared by a copolymerization reaction of hydroxystyrene or α-methyl-hydroxystyrene and acryl-based monomers. Examples of the acryl-based monomers include acrylic esters, methacrylic esters, acrylamide, methacrylamide, acrylonitrile, and so on.

The resin having an epoxy group may be, for example, a novolac epoxy resin, a bisphenol-A epoxy resin, an acryl epoxy resin, and so on.

The resin having hydroxyl and carboxyl groups may be, for example, a resin including a phenolic hydroxyl group or a hydroxystyrene resin that has a carboxyl substituent. Alternatively, the resin having hydroxyl and carboxyl groups may be a copolymer of an acryl-based monomer having a hydroxyl group and an acryl-based monomer having a carboxyl group.

The binder may have an average molecular weight ranging from 500 to 100,000 g/mol. When the average molecular weight of the binder is less than 500 g/mol, the dispersion of the glass frit is worsened upon preparing a paste. On the other hand, when the average molecular weight of the binder is more than 100,000 g/mol, the binder develops too slowly or does not work.

The amount of the binder may range from 50 to 95 weight % based on the total weight of the vehicle. When the amount of the binder is less than 50%, the coating and dispersing properties of the composition for the barrier rib are worsened. When the amount of the binder is more than 95%, the cross-linking reaction may be insufficient so that it is impossible to obtain a required pattern.

The cross-linking agent includes at least one resin selected from the group consisting of a melamine resin, a urea resin, a guanamine resin, a glycoluryl-formaldehyde resin, a succinylamide-formaldehyde resin, an ethyleneurea-formaldehyde resin, and combinations thereof. As a non-limiting example, a melamine resin and a urea resin may be appropriate in terms of cross-linking reactivity and commercially availability. Specific examples of the melamine resin or urea resin include an alkoxymethylated melamine resin or an alkoxymethylated urea resin. Such an alkoxymethylated melamine resin or an alkoxymethylated urea resin may be prepared by subjecting a composition obtained from a reaction between melamine or urea, and formalin to esterification using lower alcohols such as methanol, ethanol, propylalcohol, and so on.

The amount of the cross-linking agent may range from 5 to 50 weight % based on the total weight of the vehicle. When the amount of the cross-linking agent is less than 5%, the cross-linking reaction may be insufficient so that the obtained pattern collapses during the developing process. On the other hand, when the amount of the cross-linking agent is more than 50%, the dispersion and printing properties of the barrier rib-forming composition are worsened.

The barrier rib-forming composition may further include an additive such as a polymerization inhibitor and an antioxidant for improving the storage stability of the composition, an ultraviolet ray absorber for improving resolution, an anti-foaming agent for reducing bubbles in the composition, a dispersing agent for improving dispersion properties, a leveling agent for improving the flatness of a printed layer, a plasticizer for improving thermal decomposition, a thixotropic agent for endowing thixotropic characteristics, and so on.

Any suitable solvent may be used as long as the solvent does not interfere with the dispersion of the metal oxide, dissolves the binder and the photoacid generator; mixes well with the binder and the additives, and has a boiling point of 150° C. or more. If the boiling point of the solvent is less than 150° C., the solvent may volatilize during the 3-roll milling process or may volatilize too quickly during the printing process to provide a suitable printability.

As non-limiting examples, the solvent may be at least one selected from the group consisting of ethyl carbitol, butyl carbitol, ethyl carbitol acetate, butyl carbitol acetate, texanol, terpine oil, diethylene glycol, dipropylene glycol, tripropylene glycol, dipropyleneglycol methylether, dipropyleneglycol ethylether, dipropyleneglycol monomethylether acetate, γ-butyrolactone, cellosolve acetate, and butylcellosolve acetate, and combinations thereof.

The amount of the solvent is not limited as long as it provides a suitable viscosity for printing or coating processes.

The metal oxide sol includes a photoacid generator, which generates acid when irradiated with light. As non-limiting examples, the photoacid generator may be at least one selected from the group consisting of onium salts or sulfonium salts, organic halogens, naphthoquinone-diazide-sulfonic acid, and photoreactive sulfonic acid, and combinations thereof.

Specific non-limiting examples of the onium salts or sulfonium salts include at least one selected from the group consisting of diphenyliodine hexafluoro phosphate, diphenyliodine hexafluoro arsenate, diphenyliodine hexafluoro antimonate, diphenylparamethoxyphenyl triflate, diphenylpara toluenyl triflate, diphenylparaisobutylphenyl triflate, diphenylpara-t-butylphenyl triflate, triphenylsulfonium hexafluoro phosphate, triphenylsulfonium hexafluoro arsenate, triphenylsulfonium hexafluoro antimonate, triphenylsulfonium triflate, and dibutylnaphthylsulfonium triflate, and combinations thereof.

Non-limiting examples of the organic halogen compound include at least one selected from the group consisting of tribromoacetophenone, a phenyltrihalomethyl-sulfone compound, a halomethyl-s-triazine compound, and a halomethyl-oxadiazole compound, and combinations thereof.

Non-limiting examples of the naphthoquinone-diazide-sulfonic acid compound include at least one selected from the group consisting of 1,2-naphthoquinone-2-diazide-4-sulfonyichloride, and 1,2-naphtoquinone-2-diazide-5-sulfonylchloride, and combinations thereof.

Non-limiting examples of the photoreactive sulfonic acid compound include at least one selected from the group consisting of 1,2-naphthoquinone-2-diazide-4-sulfonic acid ester, 1,2-naphthoquinone-2-diazide-5-sulfonic acid amide, a compound having a β-keto sulfone group, an ester compound of nitro benzyl alcohol, an ester compound of arylsulfonic acid, an oxime ester compound, a N-hydroxamide ester compound, a N-hydroxyimide ester compound, a sulfonic acid ester compound, and a benzoin acid ester compound, and combinations thereof.

The amount of the photoacid generator may range from 0.1 to 5 parts by weight based on 100 parts by weight of the vehicle. When the amount of the photoacid generator is less than 0.1 parts by weight, the cross-linking reaction may not sufficiently occur, but when the amount is more than 5 parts by weight, the photoacid generator absorbs irradiated light and reduces the exposure sensitivity of the barrier rib-forming composition.

The photoacid generator may be used with a sensitizer to improve the exposure sensitivity. Non-limiting examples of the sensitizer include at least one selected from the group consisting of anthracene, phenanthrene, 1,2-benzoanthracene, 1,6-diphenyl-1,3,5-hexatriene, 1,1,4,4-tetraphenyl-1,3-butadiene, 2,3,4,5-tetraphenylfuran, 2,5-diphenylthiophene, thioxanthone, 2-chloro-thioxanthone, phenothiazine, 1,3-diphenylpyrazoline, benzophenone, 4-hydroxy-benzophenone, fluorescein, and rhodamine, and combinations thereof.

The amount of the sensitizer may range from 1 to 1000 parts by weight based on 100 parts by weight of the photoacid generator. When the amount of sensitizer is less than 1 part by weight, the sensitizing efficiency is insufficient. When the amount is more than 100 parts by weight, the sensitizer does not absorb the irradiated light so that the exposure sensitivity is worsened.

The composition for the barrier rib according to one embodiment of the present invention may be provided in accordance with the following procedure.

First, the metal oxide sol is prepared. The metal oxide sol is provided by preparing a metal oxide precursor, and dispersing the metal oxide precursor and a photoacid generator in the vehicle. The vehicle includes a binder and a cross-linking agent, and may further include an additive and a solvent. The vehicle is prepared as a uniform and clear solution by preliminarily mixing and fully agitating each vehicle component.

The prepared metal oxide sol is mixed with the glass frit to provide a paste. The metal oxide sol and the glass frit may be mixed by using a planetary mixer (PLM) and/or mechanically mixed by applying for the paste several times to a 3-roll mill. After finishing the 3-roll mill process, the paste is filtered and degassed using a vacuum pump to provide the barrier rib-forming composition.

According to another embodiment of the present invention, a plasma display panel is provided by using the barrier rib-forming composition.

Hereinafter, a method for fabricating a barrier rib for a plasma display panel is described.

A barrier rib-forming composition is coated onto a rear substrate of the plasma display, on which an address electrode and a dielectric material have been formed, by a screen printing or a table coater. Then, the barrier rib-forming composition is dried in a drying oven or an IR oven at a temperature of 80 to 120° C. for 5 to 60 minutes to remove most of the solvent.

The barrier rib-forming composition is irradiated in a predetermined pattern by an ultraviolet (UV) exposure apparatus mounted with a photomask. Then, the barrier rib-forming composition is baked at a temperature ranging from 80 to 150° C. for 5 to 60 minutes to promote a cross-linking reaction. Thereby, the irradiated portions of the barrier rib-forming composition are converted into an insoluble state.

The baked barrier rib-forming composition is developed with an alkali developing solution such as $Na_2CO_3$ solution, KOH solution, tetramethylammonium hydroxide (TMAH) solution or monoethanolamine solution, which is diluted with the pure water at a temperature of around 30° C. to remove unexposed portions of the barrier rib composition and to provide a pattern.

The rear plate formed with the pattern is fired in an electric furnace at 500 to 600° C. for 5 to 60 minutes to remove the remaining vehicle and to sinter the low-melting glass frit. Thereby, it is possible to provide a patterned barrier rib.

In the following detailed description, only certain exemplary embodiments of the present art would realize, the described embodiments may be modified in various different ways, all without departing from the spirit or scope of the present invention.

Figure 1:
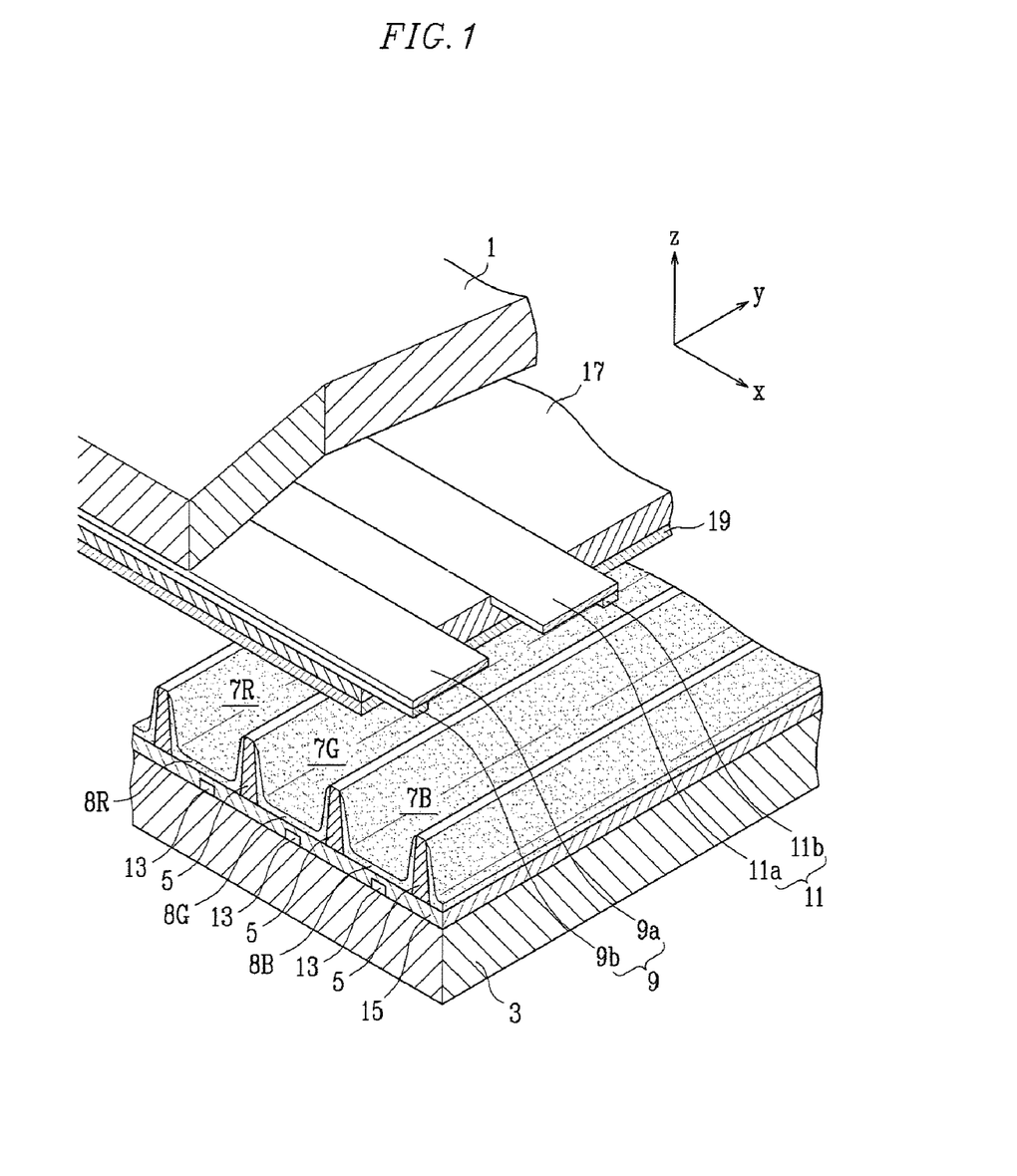
FIG. 1 is a partial exploded perspective view showing a structure of a plasma display panel according to an embodiment of the present invention.

FIG. 1 is a partial exploded perspective view showing the structure of a plasma display panel according to an embodiment of the present invention. Referring to FIG. 1, the plasma display panel includes a first substrate 3, a plurality of address electrodes 13 disposed in one direction (a Y direction in the drawing) on the first substrate 3, and a first dielectric layer 15 disposed on the surface of the first substrate 3 covering the address electrodes 13. Barrier ribs 5 are formed on the first dielectric layer 15, and red (R), green (G), and blue (B) phosphor layers 8R, 8G, and 8B are disposed in discharge cells 7R, 7G, and 7B formed between the barrier ribs 5.

The barrier ribs 5 are manufactured using the barrier rib-forming composition. The barrier ribs 5 may be formed in any shape or pattern as long as the barrier ribs 5 can partition the discharge space of the plasma display panel. For example, the barrier ribs 5 may be formed as stripes to provide an open discharge space, or may be formed as a waffle, matrix, or delta shape to provide a closed discharge space. Also, the barrier ribs may be formed such that a horizontal cross-section of the closed discharge space is a polygon such as quadrangle, triangle, or pentagon, or a circle or oval.

Display electrodes, each including a pair of transparent electrodes 9a and 11a and bus electrodes 9b and 11b, are disposed in a direction crossing the address electrodes 13 (an X direction in the drawing) on one surface of a second substrate 1 facing the first substrate 3. Also, a second dielectric layer 17 and an MgO protective layer 19 are disposed on the surface of the second substrate 1 while covering the display electrodes.

Discharge cells are formed at positions where the address electrodes 13 of the first substrate 3 are crossed by the display electrodes of the second substrate 1.

In the plasma display panel, address discharge is performed by applying an address voltage (Va) to a space between the address electrodes 13 and the display electrodes. When a sustain voltage (Vs) is applied to a space between a pair of display electrodes, an excitation source generated from the sustain discharge excites a corresponding phosphor layer to thereby emit visible light through the second substrate 1 and display an image. The phosphors are usually excited by vacuum ultraviolet (VUV) rays.

The following examples illustrate aspects of the present invention in more detail. However, it is understood that the present invention is not limited by these examples.

Preparation of Metal Oxide Precursor

EXAMPLE 1

100 ml of n-butanol and 100 ml of tripropylene glycol were introduced into a reactor mounted with a thermometer and an agitator, and agitated while slowly adding 10 ml of 28% ammonia water. After agitating the mixture for about 30 minutes, 10.0 g of titanium chloride was slowly added thereto with agitating. Thereafter, the mixture was agitated at room temperature for 6 hours to complete the hydrolysis and condensation reactions. N-butanol and pure water were removed by vacuum distillation to provide a titanium oxide precursor having a dispersing solvent of tripropylene glycol.

EXAMPLE 2

100 ml of n-propanol and 100 ml of dipropylene glycol were introduced into a reactor mounted with a thermometer and an agitator and agitated while slowly adding 5 ml of 1.0N hydrochloric acid. After agitating the mixture for about 30 minutes, 10.0 g of zirconium n-proxide was slowly added thereto with continued agitation. Thereafter, the mixture was agitated at room temperature for 24 hours to complete the hydrolysis and condensation reactions. N-propanol and pure water were removed by vacuum distillation to provide a zirconium oxide precursor having a dispersing solvent of dipropylene glycol.

EXAMPLE 3

100 ml of ethanol and 100 ml of dipropylene glycol were introduced into a reactor mounted with a thermometer and an agitator and agitated while slowly adding 5 ml of 1.0N hydrochloric acid. After agitating the mixture for about 30 minutes, 10.0 g of tetraethoxysilane was slowly added thereto with continued agitation. Thereafter, the mixture was agitated at room temperature for 6 hours to complete the hydrolysis and condensation reactions. Ethanol and pure water were removed by vacuum distillation to provide a silicon oxide precursor having a dispersing solvent of dipropylene glycol.

EXAMPLE 4

100 ml of isopropanol and 100 ml of tripropylene glycol were introduced into a reactor mounted with a thermometer and an agitator and agitated while slowly adding 5 ml of 1.0N hydrochloric acid. After agitating the mixture for about 30 minutes, 10.0 g of aluminum isoproxide was slowly added thereto with continued agitation. Thereafter, the mixture was agitated at room temperature for 6 hours to complete the hydrolysis and condensation reactions. Isopropanol and pure water were removed by vacuum distillation to provide an aluminum oxide precursor having a dispersing solvent of tripropylene glycol.

EXAMPLE 5

100 ml of ethanol and 100 ml of diethylene glycol were introduced into a reactor mounted with a thermometer and an agitator and agitated while slowly adding 10 ml of 28% ammonia water. After agitating the mixture for about 30 minutes, 5.0 g of tetraethoxysilane and 5.0 g of titanium chloride were slowly added with continued agitation. Thereafter, the mixture was agitated at room temperature for 6 hours to complete the hydrolysis and condensation reactions. Then, 0.1 g of bis (meth acryloxyethyl)phosphate was added thereto and the mixture was agitated at room temperature for 6 hours. Ethanol and pure water were removed by vacuum distillation to provide a silicon-titanium oxide precursor having a dispersing solvent of diethylene glycol.

Measurement of Properties of Metal Oxide Precursor

The metal oxide precursors prepared from Examples 1 to 5 were measured to determine the refractive index, the specific gravity, and the average particle diameter of the metal oxide. The results are shown in the following Table 1. The refractive index and the specific gravity values were determined at 20° C., and the average particle diameter was measured by the Photon Correlation Spectroscopy (PCS).

TABLE 1

|  | Metal oxide | Refractive index at 20° C. | Specific gravity at 20° C. | Average particle diameter (nm) |
| --- | --- | --- | --- | --- |
| Example 1 | titanium oxide | 2.58 | 3.96 | 6.8 |
| Example 2 | zirconium oxide | 2.08 | 5.78 | 9.2 |
| Example 3 | silicon oxide | 1.46 | 2.23 | 15.1 |
| Example 4 | aluminum oxide | 1.78 | 3.90 | 8.4 |
| Example 5 | silicon-titanium oxide | 2.03 | 3.14 | 7.8 |

Preparation of Vehicle

EXAMPLE 6

A vehicle was provided by combining 50 parts by weight of a binder (a novolac resin prepared by combining m-cresol with formalin in the presence of an oxalic acid catalyst, average molecular weight: 18,000 g/mol), 12 parts by weight of a cross-linking agent (hexamethoxymethyl-melamine), 1.0 parts by weight of a photoacid generator (triphenylsulfonium triflate), and 37 parts by weight of a solvent (tripropylene glycol).

EXAMPLE 7

A vehicle was provided by combining 50 parts by weight of a binder (a copolymer of vinylphenol and N-(4-hydroxyphenyl) maleimide (average molecular weight: 15,000 g/mol)), 15 parts by weight of a cross-linking agent (methanol/ethanol-modified benzoguanamine), 1.5 parts by weight of a photoacid generator (2,4-bis(trichloromethyl)-6-[2-(3,5-dimethoxyphenyl)ethenyl]-s-triazine), and 33.5 parts by weight of a solvent (tripropylene glycol).

Analysis of Properties of Vehicle

The vehicles provided from Examples 6 and 7 were measured to determine the refractive index and the specific gravity, and the results are shown in the following Table 2.

TABLE 2

|  | Refractive index at 20° C. | Specific gravity at 20° C. |
| --- | --- | --- |
| Example 6 | 1.55 | 1.14 |
| Example 7 | 1.54 | 1.12 |

Preparation of Metal Oxide Sol

EXAMPLE 8

The vehicle of Example 6 was introduced into an agitator and agitated while slowly adding the titanium oxide precursor of Example 1. The amount of the titanium oxide precursor added to the vehicle was calculated to provide a ratio of 11 parts by volume of titanium oxide to 100 parts by volume of the vehicle. (Here, the term "volume of titanium oxide" refers to the calculated volume of only the titanium oxide portion of the titanium oxide precursor, excluding the solvent.) Then, the mixture was agitated for several hours to provide a clear metal oxide sol.

The refractive index of the provided metal oxide sol was 1.65.

EXAMPLE 9

A metal oxide sol was prepared as in Example 8 except that the zirconium oxide precursor of Example 2 was added with the vehicle of Example 6. The amount of the zirconium oxide precursor added to the vehicle was calculated to provide 17 parts by volume of zirconium oxide to 100 parts by volume of the vehicle. The refractive index of the metal oxide sol was 1.63.

EXAMPLE 10

A metal oxide sol was prepared as in Example 8 except that the silicon oxide precursor of Example 3 was mixed with the vehicle of Example 7. The amount of the silicon oxide precursor added to the vehicle was calculated to provide about 25 parts by volume of silicon oxide to 100 parts by volume of the vehicle. The refractive index of provided metal oxide sol was 1.53.

EXAMPLE 11

A metal oxide sol was prepared as in Example 8 except that the aluminum oxide precursor of Example 4 was mixed with the vehicle of Example 7. The amount of the aluminum oxide precursor added to the vehicle was calculated to provide about 25 parts by volume of aluminum oxide to 100 parts by volume of the vehicle. The refractive index of the provided metal oxide sol was 1.59.

EXAMPLE 12

A metal oxide sol was prepared in accordance with the procedure of Example 8 except that the silicon-titanium oxide precursor of Example 5 was mixed with the vehicle of Example 7. The amount of the silicon-titanium oxide precursor added to the vehicle was calculated to provide 17 parts by volume of silicon-titanium oxide to 100 parts by volume of the vehicle. The refractive index of the provided metal oxide sol was 1.62.

Preparation of Barrier Rib-Forming Composition

EXAMPLE 13

40 parts by volume of the metal oxide sol of Example 8 was mixed with 55 parts by volume of a low-melting glass frit (ZnO—BaO—$B_2O_3$-based, amorphous, $D_{50}$=3.2 μm, refractive index=1.68, specific gravity=3.86) and 5 parts by volume of a high-melting glass frit ($SiO_2$—$B_2O_3$—$Al_2O_3$-based, amorphous, $D_{50}$=2.5 μm, refractive index=1.67, specific gravity=3.67) to provide a barrier rib-forming composition.

EXAMPLE 14

A barrier rib-forming composition was prepared as in Example 13 except that the metal oxide sol of Example 9 was used instead of the metal oxide sol of Example 8.

EXAMPLE 15

40 parts by volume of the metal oxide sol of Example 10 was mixed with 55 parts by volume of a low-melting glass frit ($Li_2O$—$SiO_2$—$B_2O_3$-based, amorphous, $D_{50}$=3.2 μm, refractive index=1.56, specific gravity=2.56) and 5 parts by volume of a high-melting glass frit ($SiO_2$—$B_2O_3$—$Al_2O_3$-based, amorphous, $D_{50}$=3.0 μm, refractive index=1.55, specific gravity=2.52) to provide a barrier rib-forming composition.

EXAMPLE 16

A barrier rib-forming composition was prepared as in Example 15 except that the metal oxide sol of Example 11 was used instead of the metal oxide sol of Example 10.

EXAMPLE 17

A barrier rib-forming composition was prepared as in Example 13 except that the metal oxide sol of Example 12 was used instead of the metal oxide sol of Example 8.

COMPARATIVE EXAMPLE 1

37 parts by volume of the vehicle according to Example 6 was mixed with 55 parts by volume of the low-melting glass frit ($Li_2O$—$SiO_2$—$B_2O_3$-based, amorphous, $D_{50}$=3.2 μm, refractive index=1.56, specific gravity=2.56) and 8 parts by volume of the high-melting glass frit ($SiO_2$—$B_2O_3$—$Al_2O_3$-based, amorphous, $D_{50}$=3.0 μm, refractive index=1.55, specific gravity=2.52) to provide a barrier rib-forming composition.

Analysis of Barrier Rib-Forming Compositions

Each of barrier rib-forming compositions provided in Examples 13 to 17 was coated onto a 6" glass substrate with a coater and dried at 100° C. for 30 minutes in a drying oven. Thereafter, the substrate was irradiated at 300 to 1000 mJ/cm² by UV light from a high pressure mercury lamp ultraviolet (UV) exposure apparatus mounted with a photomask having a high pressure lattice pattern (length: line width=40 μm (pitch=160 μm), width: line width=40 μm (pitch=560 μm)). The irradiated glass substrate was then baked in a drying oven at 120° C. for 10 minutes, and sprayed with a 0.8 wt % sodium carbonate aqueous solution at a nozzle pressure of 1.5 kgf/cm² for 200 seconds and developed. Then, the substrate was sprayed and washed with pure water at a nozzle pressure of 1.2 kgf/cm² for 30 seconds. Subsequently, the substrate was dried with an air knife and i fired in an electric furnace at 560° C. for 20 minutes to provide barrier ribs. The provided barrier ribs were analyzed by an optical microscope and a scanned electron microscope (SEM), and the results are shown in the following Table 3.

TABLE 3

| | Exposure (mJ/cm²) | Film thickness after firing | Upper width of the barrier rib | Lower width of the barrier rib |
|---|---|---|---|---|
| Example 13 | 450 | 115 μm | 43 μm | 61 μm |
| Example 14 | 550 | 116 μm | 45 μm | 58 μm |
| Example 15 | 400 | 117 μm | 47 μm | 57 μm |
| Example 16 | 450 | 117 μm | 48 μm | 53 μm |
| Example 17 | 750 | 115 μm | 52 μm | 48 μm |

Referring to Table 3, the barrier rib-forming composition according to Example 17 had a low exposure sensitivity, which is believed to be due to the relatively large difference between the refractive index of the metal oxide sol and that of the glass frit.

In addition, Table 3 shows that the lower exposure sensitivity correlates with an increased upper width and decreased lower width of the barrier rib. As the difference between the refractive index of the metal oxide sol and the glass frit was increased, the photo-transmittance was decreased but the reflectivity and the scattering were increased.

Fabrication of Plasma Display Panel and Characteristic Analyst Thereof

6" panels were fabricated using each of barrier rib-forming compositions according to Examples 13 to 17 and Comparative Example 1. The provided panels were analyzed to determine their luminance, and the results of Examples 13 to 14 and Comparative Example 1 are shown in the following Table 4.

TABLE 4

| | Luminance |
|---|---|
| Example 13 | 1.29 lm/W |
| Example 14 | 1.35 lm/W |
| Comparative Example 1 | 1.12 lm/W |

Table 4 shows that when the panels having barrier ribs formed with the barrier rib-forming compositions of Examples 13 to 14 showed an improvement in luminance of 15 to 20% in comparison to a panel formed with the barrier rib-forming composition of Comparative Example 1. It is believed that the metal oxide formed on the barrier ribs using a metal oxide sol provided an increased reflectivity of visible light, which provided an increased luminance. Panels formed using the barrier rib-forming compositions of Examples 15 to 17 showed a similar luminance to those formed with the compositions of Examples 13 to 14.

The barrier rib-forming composition according to aspects of the present invention prevents a decrease in exposure sensitivity due to the exposure to oxygen, so that a high sensitivity, high resolution and high precision barrier rib can be provided. The barrier ribs obtained by the barrier rib-forming composition provides improved reflectivity compared to that of the conventional barrier ribs.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A barrier rib-forming composition, comprising:
a metal oxide sol and
a glass frit,
wherein the metal oxide sol comprises a photoacid generator, and
wherein the difference between the average refractive index ($N_1$) of the metal oxide sol and average refractive index ($N_2$) of the glass frit satisfies the following Equation 1:

$$-0.2 \leq N_1 - N_2 \leq 0.2; \quad \text{Equation 1}$$

wherein the photoacid generator is selected from the group consisting of an onium salt, a sulfonium salt, an organic halogen, naphthoquinone-diazide-sulfonic acid, a photoreactive sulfonic acid, and combinations thereof.

2. The barrier rib-forming composition of claim 1, wherein the difference between the average refractive index ($N_1$) of the metal oxide sol and average refractive index ($N_2$) of the glass frit satisfies the following Equation 2:

$$-0.1 \leq N_1 - N_2 \leq 0.1 \quad \text{Equation 2.}$$

3. The barrier rib-forming composition of claim 2, wherein the difference between the average refractive index ($N_1$) of the metal oxide sol and average refractive index ($N_2$) of the glass frit satisfies the following Equation 3

$$-0.05 \leq N_1 - N_2 \leq 0.05 \quad \text{Equation 3.}$$

4. The barrier rib-forming composition of claim 1, wherein the metal oxide sol comprises a metal oxide and a vehicle.

5. The barrier rib-forming composition of claim 4, wherein the metal oxide is dispersed in the vehicle.

6. The barrier rib-forming composition of claim 1, wherein the metal oxide sol is prepared by subjecting a metal alkoxide or metal halide compound to hydrolysis and condensation to obtain a metal oxide precursor and dispersing the metal oxide precursor in a vehicle.

7. The barrier rib-forming composition of claim 6, wherein the metal oxide precursor has an average refractive index ranging from 1.3 to 3.0.

8. The barrier rib-forming composition of claim 4, wherein the metal oxide sol comprises 5 to 50 parts by volume of metal oxide based on 100 parts by volume of the vehicle.

9. The barrier rib-forming composition of claim 4, wherein the metal oxide comprises an oxide of a metal selected from the group consisting of silicon (Si), titanium (Ti), aluminum (Al), zirconium (Zr), tantalum (Ta), germanium (Ge), yttrium (Y), zinc (Zn), and combinations thereof.

10. The barrier rib-forming composition of claim 4, wherein the metal oxide has an average particle diameter ranging from 1 to 60 nm.

11. The barrier rib-forming composition of claim 10, wherein the metal oxide has an average particle diameter ranging from 2 to 40 nm.

12. The barrier rib-forming composition of claim 11, wherein the metal oxide has an average particle diameter ranging from 4 to 20 nm.

13. The barrier rib-forming composition of claim 1, wherein the metal oxide sol has an average refractive index ($N_1$) ranging from 1.4 to 2.0.

14. The barrier rib-forming composition of claim 1, wherein the glass frit has an average refractive index ($N_2$) ranging from 1.5 to 1.8.

15. The barrier rib-forming composition of claim 4, wherein the metal oxide is present in an amount of 1 to 30 parts by volume based on 100 parts by volume of the glass frit.

16. The barrier rib-forming composition of claim 4, wherein average thermal expansion coefficients (CTE, α) of the metal oxide and glass frit satisfy the following Equation 4:

$$\begin{array}{l}\text{thermal expansion coefficient of the substrate} \times \\ 0.9 \leq \alpha \leq \text{thermal expansion coefficient of the} \\ \text{substrate} \end{array} \quad \text{Equation 4.}$$

17. The barrier rib-forming composition of claim 1, wherein the glass frit comprises a low-melting glass frit and a high-melting glass frit.

18. The barrier rib-forming composition of claim 17, wherein the particle diameter of the low-melting glass frit has a mean value ($D_{50}$) ranging from 2 to 5 μm, a minimum value ($D_{min}$) of 0.1 μm, and a maximum value ($D_{max}$) of 20 μm.

19. The barrier rib-forming composition of claim 17, wherein the softening temperature (Ts) of the low-melting glass frit satisfies the following Equation 5:

$$\text{barrier rib firing temperature} - 80°\text{C.} < Ts < \text{barrier rib firing temperature} \quad \text{Equation 5}$$

wherein the barrier rib firing temperature is a predetermined firing temperature used in forming a barrier rib from the barrier rib-forming temperature.

20. The barrier rib-forming composition of claim 17, wherein the low-melting glass frit is present in an amount of 70 to 100 volume % based on the total volume of the glass frit.

21. The barrier rib-forming composition of claim 17, wherein the low-melting glass frit is at least one selected from the group consisting of PbO—$B_2O_3$-based, PbO—$SiO_2$—$B_2O_3$-based, $Bi_2O_3$—$B_2O_3$-based, $Bi_2O_3$—$SiO_2$—$B_2O_3$-based, $SiO_2$—$B_2O_3$—$Al_2O_3$-based, $SiO_2$—$B_2O_3$—BaO-based, $SiO_2$—$B_2O_3$—CaO-based, ZnO—$B_2O_3$—$Al_2O_3$-based, ZnO—$SiO_2$—$B_2O_3$-based, $P_2O_5$-based, SnO—$P_2O_5$-based, $V_2O_5$—$P_2O_5$-based, $V_2O_5$—$Mo_2O_3$-based, and $V_2O_5$—$P_2O_5$—$TeO_2$-based glass frits and combinations thereof.

22. The barrier rib-forming composition of claim 17, wherein the particle diameter of the high-melting glass frit has a mean value ($D_{50}$) ranging from 1 to 4 μm, a minimum value ($D_{min}$) of 0.1 μm, and a maximum value ($D_{max}$) of 20 μm.

23. The barrier rib-forming composition of claim 17, wherein the softening temperature (Ts) of the high-melting glass frit satisfies the following Equation 6:

$$Ts > \text{barrier rib firing temperature} + 20°\text{C.}, \quad \text{Equation 6}$$

wherein the barrier rib firing temperature is a predetermined firing temperature used in forming a barrier rib from the barrier rib-forming temperature.

24. The barrier rib-forming composition of claim 17, wherein the high-melting glass frit is present in an amount of 0 to 30 volume % based on the total volume of the glass frit.

25. The barrier rib-forming composition 17, wherein the high-melting glass frit is at least one selected from the group consisting of $SiO_2$—$B_2O_3$—BaO-based, $SiO_2$—$B_2O_3$—CaO-based, $SiO_2$—$B_2O_3$—MgO-based, $SiO_2$—$B_2O_3$—CaO—BaO-based, $SiO_2$—$B_2O_3$—CaO—MgO-based, $SiO_2$—$Al_2O_3$—BaO-based, $SiO_2$—$Al_2O_3$—CaO-based, $SiO_2$—$Al_2O_3$—MgO-based, $SiO_2$—$Al_2O_3$—BaO—CaO-based, and $SiO_2$—$Al_2O_3$—CaO—MgO-based glass frits, and combinations thereof.

26. The barrier rib-forming composition of claim 17, wherein the difference between the average refractive index ($N_3$) of the low-melting glass frit and average refractive index ($N_4$) of the high-melting glass frit satisfies the following Equation 7:

$$-0.2 \leq N_3 - N_4 \leq 0.2 \qquad \text{Equation 7.}$$

27. The barrier rib-forming composition of claim 26, wherein the difference between the average refractive index ($N_3$) of the low-melting glass frit and average refractive index ($N_4$) of the high-melting glass frit satisfies the following Equation 8:

$$-0.1 \leq N_3 - N_4 \leq 0.1 \qquad \text{Equation 8.}$$

28. The barrier rib-forming composition of claim 27, wherein the difference between the average refractive index ($N_3$) of the low-melting glass frit and average refractive index ($N_4$) of the high-melting glass frit satisfies the following Equation 9:

$$-0.05 \leq N_3 - N_4 \leq 0.05 \qquad \text{Equation 9.}$$

29. The barrier rib-forming composition of claim 1, wherein the onium salt is at least one selected from the group consisting of diphenyliodine hexafluoro phosphate, diphenyliodine hexafluoro arsenate, diphenyliodine hexafluoro antimonate, diphenylparamethoxyphenyl triflate, diphenylpara toluenyl triflate, diphenylparaisobutylphenyl triflate, diphenylpara-t-butylphenyl triflate, and combinations thereof.

30. The barrier rib-forming composition of claim 1, wherein the sulfonium salt is at least one selected from the group consisting of triphenylsulfonium hexafluoro phosphate, triphenylsulfonium hexafluoro arsenate, triphenylsulfonium hexafluoro antimonate, triphenylsulfonium triflate, dibutylnaphthylsulfonium triflate, and combinations thereof.

31. The barrier rib-forming composition of claim 1, wherein the organic halogen is at least one selected from the group consisting of tribromoacetophenone, a phenyltrihalomethyl-sulfone compound, a halomethyl-s-triazine compound, a halomethyl-oxadiazole compound, and combinations thereof.

32. The barrier rib-forming composition of claim 1, wherein the naphthoquinone-diazide-sulfonic acid is at least one selected from the group consisting of 1,2-naphthoquinone-2-diazide-4-sulfonylchloride, 1,2-naphthoquinone-2-diazide-5-sulfonylchloride, and combinations thereof.

33. The barrier rib-forming composition of claim 1, wherein the photoreactive sulfonic acid is at least one selected from the group consisting of 1,2-naphthoquinone-2-diazide-4-sulfonic acid ester, 1,2-naphthoquinone-2-diazide-5-sulfonic acid amide, a compound having a .beta.-keto sulfone group, an ester compound of nitro benzyl alcohol, an ester compound of arylsulfonic acid, an oxime ester compound, a N-hydroxyamide ester compound, a N-hydroxyimide ester compound, a sulfonic acid ester compound, a benzoin acid ester compound, and combinations thereof.

34. The barrier rib-forming composition of claim 4, wherein the photoacid generator is present in an amount of 0.1 to 5 parts by weight based on 100 parts by weight of the vehicle.

35. The barrier rib-forming composition of claim 1, wherein the metal oxide sol further comprises a sensitizer.

36. The barrier rib-forming composition of claim 35, wherein the sensitizer is selected from the group consisting of anthracene, phenanthrene, 1,2-benzoanthracene, 1,6-diphenyl-1,3,5-hexatriene, 1,1,4,4-tetraphenyl-1,3-butadiene, 2,3,4,5-tetraphenylfuran, 2,5-diphenylthiophene, thioxanthone, 2-chloro-thioxanthone, phenothiazine, 1,3-diphenylpyrazoline, benzophenone, 4-hydroxy-benzophenone, fluorescein, rhodamine, and combinations thereof.

37. The barrier rib-forming composition of claim 35, wherein the sensitizer is present in an amount of 1 to 1000 parts by weight based on 100 parts by weight of the photoacid generator.

38. The barrier rib-forming composition of claim 4, wherein the vehicle further comprises a binder, a cross-linking agent, an additive, and a solvent, wherein the additive is selected from the group consisting of a polymerization inhibitor, an antioxidant, ultraviolet (UV) absorber, an antifoaming agent, a dispersing agent, a leveling agent, a plasticizer, a thixotropic agent, and combinations thereof.

39. The barrier rib-forming composition of claim 38, wherein the binder is soluble in an alkali developing solution.

40. The barrier rib-forming composition of claim 39, wherein the binder is at least one selected from the group consisting of a resin including a hydroxyphenol group, a hydroxystyrene resin, a resin including an epoxy group, and a resin including hydroxyl and carboxyl groups, and combinations thereof.

41. The barrier rib-forming composition of claim 40, wherein the resin including a phenolic hydroxyl group comprises a novolac resin.

42. The barrier rib-forming composition of claim 41, wherein the novolac resin comprises the condensation reaction product of a phenol and an aldehyde, or a phenol and a ketone in the presence of an acid.

43. The barrier rib-forming composition of claim 40, wherein the hydroxystyrene resin is a copolymerization reaction product of hydroxystyrene or .alpha.-methyl-hydroxystyrene and at least one acryl-based monomer.

44. The barrier rib-forming composition of claim 43, wherein the at least one acryl-based monomer comprises at least one selected from the group consisting of acrylic esters, methacrylic esters, acrylamide, methacrylamide, and acrylonitrile, and combinations thereof.

45. The barrier rib-forming composition of claim 40, wherein the resin having an epoxy group comprises at least one selected from the group consisting of a novolac epoxy resin, a bisphenol-A epoxy resin, and an acryl epoxy resin, and combinations thereof.

46. The barrier rib-forming composition of claim 40, wherein the resin having hydroxyl and carboxyl groups is selected from the group consisting of a resin including a phenolic hydroxyl group or a hydroxystyrene resin that has a carboxyl substituent; and a copolymer of an acryl-based monomer having a hydroxyl group and an acryl-based monomer having a carboxyl group.

47. The barrier rib-forming composition of claim 38, wherein the binder has a weight average molecular weight of 500 to 100,000 g/mol.

48. The barrier rib-forming composition of claim 38, wherein the binder is present in an amount of 50 to 95 weight % based on total weight of the vehicle.

49. The barrier rib-forming composition of claim 38, wherein the cross-linking agent is at least one resin selected from the group consisting of a melamine resin, a urea resin, a guanamine resin, a glycoluryl-formaldehyde resin, a succinylamide-formaldehyde resin, an ethyleneurea-formaldehyde resin, and combinations thereof.

50. The barrier rib-forming composition of claim 49, wherein the melamine resin or urea resin is alkoxymethylated.

51. The barrier rib-forming composition of claim 50, wherein the alkoxymethylated melamine resin or an alkoxymethylated urea resin is prepared by subjecting a composition obtained from a reaction between melamine or urea, and formalin to esterification with a lower alcohol selected from the group consisting of methanol, ethanol, propylalcohol, and combinations thereof.

52. The barrier rib-forming composition of claim 38, wherein the cross-linking agent is present in an amount of 5 to 50 weight % based on the total weight of the vehicle.

53. The barrier rib-forming composition of claim 38, wherein the solvent is selected from the group consisting of ethyl carbitol, butyl carbitol, ethyl carbitol acetate, butyl carbitol acetate, texanol, terpine oil, diethylene glycol, dipropylene glycol, tripropylene glycol, dipropyleneglycol methylether, dipropyleneglycol ethylether, dipropyleneglycol monomethylether acetate, .gamma.-butyrolactone, cellosolve acetate, butylcellosolve acetate, and combinations thereof.

54. A plasma display panel made using the barrier rib-forming composition of claim 1.

* * * * *

UNITED STATES PATENT AND TRADEMARK OFFICE
CERTIFICATE OF CORRECTION

| | |
|---|---|
| PATENT NO. | : 8,029,970 B2 |
| APPLICATION NO. | : 11/753049 |
| DATED | : October 4, 2011 |
| INVENTOR(S) | : Lee et al. |

It is certified that error appears in the above-identified patent and that said Letters Patent is hereby corrected as shown below:

| Issued Patent | | Description of Discrepancy |
|---|---|---|
| Column | Line | |
| 2 | 43 | Change "oxygen and and" to --oxygen and--. |
| 3 | 40 | Change "(N1)" to --$(N_1)$--. |
| 3 | 41 | Change "(N2)" to --$(N_2)$--. |
| 7 | 50 | Change "-based,$SiO_2$—" to -- -based, $SiO_2$— --. |
| 9 | 15 | Change "glycoluryl-formaldehyde" to --glycoluril-formaldehyde--. |
| 10 | 22-23 | Change "4-sulfonyichloride," to --4-sulfonylchloride,--. |
| 10 | 23 | Change "1,2-naphtoquinone-" to -- 1,2-naphthoquinone- --. |
| 11 | 43 | After "present" insert --invention have been shown and described, simply by way of illustration. As those skilled in the--. |
| 12 | 43 | Change "n-proxide" to --n-peroxide--. |
| 13 | 3 | Change "isoproxide" to --isoperoxide--. |

Signed and Sealed this
Twenty-fourth Day of April, 2012

David J. Kappos
*Director of the United States Patent and Trademark Office*

CERTIFICATE OF CORRECTION (continued)
U.S. Pat. No. 8,029,970 B2

| | | |
|---|---|---|
| 16 | 3 | Before "fired" delete "i". |
| 17 | 33 | In Claim 3, change "Equation 3" to --Equation 3:--. |
| 18 | 11-12 | In Claim 16, change "substrate.times.×0.9≤α≤.thermal" to -- substrate×0.9≤α≤thermal--. |
| 18 | 26 | In Claim 19, after "temperature" insert --,--. |
| 18 | 59 | In Claim 25, after "composition" insert --of claim--. |
| 20 | 32 | In Claim 43, change ".alpha-" to --α- --. |
| 20 | 60 | In Claim 49, change "glycoluryl-formaldehyde" to -- glycoluril-formaldehyde-. |
| 22 | 4 | In Claim 53, change ".gamma.-" to --γ- --. |